United States Patent
Neufeld et al.

(10) Patent No.: US 11,344,900 B2
(45) Date of Patent: May 31, 2022

(54) LINEAR TRANSPORT SYSTEM, MOTOR MODULE AND GUIDE RAIL FOR A LINEAR TRANSPORT SYSTEM

(71) Applicant: Beckhoff Automation GmbH, Verl (DE)

(72) Inventors: Jörg Neufeld, Paderborn (DE); Andreas Sinzenich, Steinhagen (DE); Friedrich Bömer-Schulte, Lippstadt (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/138,378

(22) Filed: Dec. 30, 2020

(65) Prior Publication Data

US 2021/0213469 A1    Jul. 15, 2021

(30) Foreign Application Priority Data

Jan. 14, 2020   (DE) ............... 10 2020 100 669.1

(51) Int. Cl.
  *B05B 3/18*  (2006.01)
  *B65G 35/06*  (2006.01)
  *B65G 54/02*  (2006.01)

(52) U.S. Cl.
  CPC ............. *B05B 3/18* (2013.01); *B65G 35/06* (2013.01); *B65G 54/02* (2013.01)

(58) Field of Classification Search
  CPC ........... B05B 3/18; B65G 35/06; B65G 54/02
  USPC ................................... 198/463.2
  See application file for complete search history.

(56) References Cited

U.S. PATENT DOCUMENTS 6,045,319 A * 4/2000 Uchida ............... D04C 3/38
                                                                  414/676
2006/0232145 A1   10/2006  Hazelton et al.

FOREIGN PATENT DOCUMENTS

| CN | 108075595 A | * | 5/2018 | ............... H02K 1/20 |
| DE | 102015102236 A1 | | 8/2016 | |
| GB | 2133757 A | * | 8/1984 | ....... H01L 21/67784 |
| GB | 2133757 A | | 8/1984 | |
| JP | 6846722 B2 | * | 3/2021 | ............ H02K 41/03 |
| WO | WO-2019021577 A1 | * | 1/2019 | ............ H02K 41/03 |

OTHER PUBLICATIONS

Office Action dated Nov. 18, 2020 in connection with German patent application No. 10 2020 100 669.1, 13 pages including English translation.

* cited by examiner

*Primary Examiner* — Gene O Crawford
*Assistant Examiner* — Lester Rushin, III
(74) *Attorney, Agent, or Firm* — Dorsey & Whitney LLP

(57) ABSTRACT

A linear transport system comprising a linear motor with at least a motor module and at least a conveyor driven by the linear motor along a path of motion is described. The motor module thereby comprises a stator magnetically interacting with a magnet device of the conveyor and having a plurality of stator teeth arranged side by side along the path of motion and a plurality of electric coils each wound around a stator tooth. The linear transport system further comprises a fluid system comprising at least a fluid channel passing through a stator tooth of the stator of the motor module.

18 Claims, 15 Drawing Sheets

LINEAR TRANSPORT SYSTEM, MOTOR MODULE AND GUIDE RAIL FOR A LINEAR TRANSPORT SYSTEM

CROSS-REFERENCE TO RELATED APPLICATIONS

This application claims the priority of German patent application DE 10 2020 100 669.1, filed Jan. 14, 2020, entitled LINEARES TRANSPORTSYSTEM SOWIE MOTORMODUL UND FÜHRUNGSSCHIENE FÜR EIN SOLCHES LINEARES TRANSPORTSYSTEM, which is incorporated by reference herein, in the entirety and for all purposes

FIELD

The present invention relates to a linear transport system comprising at least a motor module and at least a conveyor driven by the motor module along a guide rail. Furthermore, the present invention relates to the motor module and to a guide rail for such a linear transport system.

BACKGROUND

Drives implemented by electric motors are used in automation technology to set machine parts in motion, e.g. in packaging machines or in transport systems. If a product or a machine element is to be moved over a longer distance, linear motors are often used as electrical drive motors. Such linear motors comprise a stator extending along the desired path of motion as well as one or more conveyors or, respectively, rotors moving along the stator. The stator comprises electrical drive coils for generating a magnetic field that may be moved along the stator. The interaction of this travelling magnetic field with permanent magnets arranged at the rotors causes the rotors to move. By suitably controlling of the electrical drive coils, a plurality of rotors may be individually controlled along the same path of motion.

Regular lubrication of the mechanically strained components of the linear transport system is advantageous in order to reduce the temperature and current consumption of the linear transport system as well as the wear of the guide rail and to increase the service life of the respective components. This applies in particular to the running surfaces of the guide rail of the linear transport system. Lubrication usually requires stopping the linear transport system, which increases maintenance requirements. One way of reducing maintenance and the associated downtime is to use an automatic lubrication system that automatically distributes the lubricant without user intervention. Such an automatic lubrication system requires permanently installed fluid lines that deliver the lubricant directly to the components to be lubricated.

In a linear transport system in which the stator is surrounded on both sides by permanent magnets of a rotor to improve the interaction between the alternating magnetic field and the rotors, this geometry and the high packing density of the components make it difficult to provide appropriate fluid lines within the motor module. In addition to an automatic lubrication system, this limitation also applies to other functions of the motor module that may be realized by fluid lines, e.g. hydraulic or pneumatic functions.

SUMMARY

The object of the present invention is to provide means of transporting fluids through the engine module.

According to a first aspect, a linear transport system comprises a linear motor having at least a motor module and at least a conveyor driven by the linear motor along a path of motion. The motor module comprises a stator magnetically interacting with a magnetic device of said conveyor, said stator having a plurality of stator teeth arranged side by side along said path of motion and a plurality of electric coils each wound around a stator tooth. The linear transport system further comprises a fluid system comprising at least a fluid channel running through a stator tooth of the stator.

According to a second aspect, a motor module for a linear transport system for driving at least a conveyor along a path of motion comprises a stator which, during operation of the linear transport system, magnetically interacts with a magnet device of the conveyor, wherein a fluid channel is formed by a tube arranged in a bore passing through the stator. The motor module is embodied for mounting onto a guide rail, wherein the fluid channel is embodied as a supply channel of a lubrication system associated with the linear transport system for supplying a lubricant to at least one running surface of the guide rail.

According to a third aspect, a guide rail for a linear transport system with at least a motor module for driving at least a conveyor along a path of motion predetermined by the guide rail, comprises a mounting surface for mounting onto a correspondingly formed mounting surface of the motor module, and at least a fluid channel fluidically communicating with a fluid connection formed in the mounting surface of the motor module.

EXAMPLES

A linear transport system comprises a linear motor having at least a motor module and at least a conveyor driven by the motor module, which is movable along a predetermined path of motion. The motor module thereby comprises a stator magnetically interacting with a magnetic device of the conveyor and having a plurality of stator teeth arranged side by side along the path of motion and a plurality of electric coils each wound around a stator tooth. The linear transport system further comprises a fluid system comprising at least one fluid channel running through a stator tooth of the stator. The fluid system allows the linear transport system to be expanded to include additional functions. In particular, the fluid channel running through the stator tooth allows the realization of corresponding functions in a particularly simple and advantageous way. Since the fluid channel runs through a stator tooth, the system may be realized even with very high packing density of the motor module. Furthermore, the external shape and dimensions of the motor module remain unchanged due to the accommodation of the fluid channel within the stator, thus ensuring full compatibility with existing motor modules. Accommodating the fluid channel in the stator also has the advantage that the heat generated in the stator during operation of the linear transport system reduces the viscosity of the fluid passing through the fluid channel. As a result, the fluid may be transported through the fluid channel with a significantly lower pumping capacity or, respectively, pressure. In addition, the reduced viscosity of the fluid allows the use of a special thin fluid channel, which is associated with a smaller modification of the stator tooth and thus a smaller change in its magnetic properties. Finally, the reduction in the viscosity of the fluid due to heat also allows the use of fluids with higher viscosity which is particularly advantageous for the use of lubricants since higher-viscosity lubricants adhere better to the lubricated surfaces than low-viscosity lubricants. In this way, the lubrication intervals may be extended if necessary.

In one embodiment, the fluid channel is formed in a stator tooth, around which no electric coil is wound. Since the electric coils in the wound stator teeth of the stator generate a significantly stronger magnetic field than in the unwound stator teeth of the same stator, the magnetic field never reaches saturation during operation of the linear transport system. Thus, it is possible to reduce the effective width of the unwound stator tooth by embedding the fluid channel without resulting in a noticeable reduction in the magnetic field strength required to drive the conveyor. Furthermore, the use of an unwound stator tooth for accommodating the fluid channel also has the advantage of not occupying the space required for the windings of the electric coils. This aspect, as well, contributes to the fact that the high magnetic field strength generated by the electric coils and necessary for operating the linear transport system may be realized.

In another embodiment, the fluid channel is provided by a tube arranged in a bore passing through the respective stator tooth or in a groove formed on a side wall of the respective stator tooth. The tube enables the fluid channel to be particularly tight against the fluids transported through the fluid channel. Furthermore, this manner ensures that the fluids passing through the fluid channel do not affect the stator tooth. A bore hole provides a particularly stable embedding of the tube. This makes it possible to transport the fluid through the tube at a higher pressure. Furthermore, a tube embedded in the stator tooth may have a smaller wall thickness than a tube that is not completely surrounded by the material of the stator tooth. In contrast, a groove arranged laterally on the stator tooth may be realized much more easily than a bore passing through the stator tooth. Therefore, this measure may reduce the manufacturing time and effort and thus the manufacturing costs of the stator or motor module.

In a further embodiment, the fluid channel is provided with a flattened cross-sectional profile, the diameter of which is larger in a direction of magnetization of the stator tooth than its diameter in a direction perpendicular to it. With this measure, the reduction of the effective width of the stator tooth caused by the embedding of the fluid channel, which is accompanied by a weakening of the magnetizability of the respective stator tooth, may be reduced. In principle, this measure thus also permits an increase in the cross-sectional area of the fluid channel, which is decisive for the passage of fluids, by increasing the diameter of the fluid channel in the magnetizing direction of the stator tooth.

In a further embodiment, the fluid channel is embodied as a feed channel of a lubrication system for feeding a lubricant to at least one running surface of a guide rail. This measure allows for realizing a lubrication system even for such linear transport systems in which their geometry as well as the packing density of the stator do not allow any other accommodation of a corresponding lubrication channel within the motor module. Due to the integrated lubricant channels, it is no longer necessary to stop the linear transport device to lubricate the guide rails. This reduces the downtime of the linear transport system associated with maintenance. In addition to user-initiated lubrication, the internal lubricant channel may also be used for automated lubrication which allows for particularly reliable lubrication during operation. The increased reliability of the automatic lubricant delivery also reduces the risk of dry running of the mechanically strained components and thus of increased wear. The overall service life of the components involved may thus be increased.

In another embodiment, the fluid system is provided with a spray device having a nozzle for spraying a liquid or gaseous spray medium. In this case, the fluid channel is embodied as a feed channel for supplying the gaseous spray medium to the nozzle. With such a spraying device, various additional functions may be realized in the linear transport system. These include, for example, a cleaning device for cleaning the guide rail, the conveyor or an object carried along by the conveyor by a water or compressed air jet, a disinfection device for objects transported with the conveyor, a lubrication system for the rollers of the conveyors, etc.

In a further embodiment, the linear transport system is provided to also include a hydraulic or pneumatic actuator device with a hydraulic or pneumatic actuator. In this case, the fluid channel is embodied as a feed channel for supplying a liquid or gaseous pressure medium to the actuator. With such a fluidic actuator, various interactions with the conveyor or an object transported with it may be realized. In this way, the functionality of the linear transport system and, as a result, its technical field of use may be expanded.

A motor module for a linear transport system is provided for driving at least one conveyor along a path of motion. The motor module comprises a stator which magnetically interacts with a magnetic device of the conveying device during operation of the linear transport system and has a plurality of stator teeth arranged side by side along the path of motion and a plurality of electric coils each wound around a stator tooth. At least one of the stator teeth comprises at least one fluid channel for transporting a fluid through the motor module. With the fluid channel, a fluid system may be realized that expands the functionality of the linear transport system. The fluid channel running through the stator tooth thereby allows realizing corresponding functions in a particularly simple manner. Since the fluid channel is integrated in the stator tooth, the system may be realized even with very high packing density of the motor module. In addition, the external shape and mass of the motor module remain unchanged by accommodating the fluid channel within the stator, thus ensuring full compatibility with existing motor modules.

In another embodiment, the fluid channel is embodied in a stator tooth, around which no electric coil is wound. As the electric coils in the stator teeth of the stator wound with electric coils generate a significantly stronger magnetic field than in the unwound stator teeth of the same stator, the magnetic field practically never reaches saturation during operation of the linear transport system. Thus, it is possible to reduce the effective width of the stator tooth by embedding the fluid channel without resulting in a noticeable reduction in the magnetic field strength required to drive the conveyor. Furthermore, the use of an unwound stator tooth for accommodating the fluid channel also has the advantage that no space is required for the windings of the electric coils. This aspect also contributes to the fact that the high magnetic field strength necessary for the operation of the linear transport system may be realized.

In another embodiment, the fluid channel is embodied by a tube arranged in a bore passing through the respective stator tooth or in a groove formed on a side wall of the respective stator tooth. The tube enables the fluid channel to be particularly tight against the fluids transported through the fluid channel. Furthermore, this ensures that the fluids passing through the fluid channel do not corrode the material of the stator tooth and thus impair its functionality. A bore hole provides a particularly stable embedding of the tube. This makes it possible to transport the fluid through the tube at a higher pressure. In addition, the tube may have a smaller wall thickness than a tube that is not completely surrounded by the material of the stator tooth due to the complete embedding in the stator tooth. In contrast, a groove arranged laterally at the stator tooth may be realized much more easily than a bore through the stator tooth. Thus, this measure may reduce the manufacturing time and effort and thus the manufacturing costs of the stator or motor module.

In a further embodiment, the fluid channel is provided with a flattened cross-sectional profile, the diameter of which is larger in a direction of magnetization of the stator tooth than its diameter in a direction perpendicular to it. With this measure, the reduction of the effective width of the stator tooth caused by the embedding of the fluid channel, which is accompanied by a weakening of the magnetizability of the respective stator tooth, may be reduced. In principle, these measures thus also permit an increase in the cross-sectional area of the fluid channel, which is decisive for the passage of fluids, by increasing the diameter of the fluid channel involved in the magnetizing direction of the stator tooth.

In a further embodiment, it is provided that the fluid channel is embodied as a supply channel of a lubrication system associated with the linear transport system for supplying a lubricant to at least a running surface of the guide rail. Due to this measure, it is possible to realize a lubrication system even for such linear transport systems in which their geometry as well as the packing density of the stator do not allow for any other or reasonable accommodation of a corresponding lubrication channel within the motor module. Due to the integrated lubricant channels, it is no longer necessary to stop the linear transport device to lubricate the guide rails. As a result, the downtimes of the linear transport system associated with maintenance may be reduced. In addition to user-initiated lubrication, the internal lubricant channel may also be used for automated lubricant dispensing which allows for particularly reliable lubrication during operation. The increased reliability of automatic lubricant dispensing also reduces the risk of dry running of the mechanically strained components and thus of increased wear. The overall service life of the components concerned may thus be increased.

In a further embodiment, the fluid channel is provided as a supply channel for supplying a liquid or gaseous spray medium to a spraying device. This includes, for example, a cleaning device for cleaning the guide rail, the conveyor or an object carried along by the conveyor by a water or compressed air jet, a disinfection device for objects transported by the conveyor, a lubrication device for the rollers of the conveyors, etc.

In a further embodiment, the fluid channel is embodied as a supply channel of an actuator device for supplying a liquid or gaseous pressure medium to a hydraulic or pneumatic actuator. With the help of such a fluidic actuator, various interactions with the conveying device or an object transported with it may be realized. In this way, the functionality of the linear transport system and its technical field of application may be extended.

A guide rail for a linear transport system having at least a motor module for driving at least a conveyor along a path of motion predetermined by the guide rail, the guide rail comprising a mounting surface for mounting on a correspondingly formed mounting surface of the motor module and at least a fluid channel fluidically communicating with a fluid connection formed in the mounting surface of the motor module. Such a fluid channel allows for the use of the guide rail for an integrated fluid system of the linear transport system. In this way, various additional functions may be realized in the linear transport system.

In an embodiment, it is provided that the fluid channel is provided as a supply channel of a lubrication system for supplying a lubricant to at least a running surface of the guide rail. This measure allows for realizing a lubrication system even in such linear transport systems in which their geometry as well as the packing density of the stator do not allow for any other accommodation of a corresponding lubrication channel within the motor module. Due to the integrated lubricant channels, it is no longer necessary to stop the linear transport device to lubricate the guide rails. This reduces the downtimes of the linear transport system associated with maintenance. In addition to user-initiated lubrication, the internal lubricant channel may also be used for automated lubrication, which allows for particularly reliable lubrication during operation. The increased reliability of automatic lubricant dispensing also reduces the risk of dry running of the mechanically strained components and thus of increased wear. The overall service life of the components involved may thus be increased.

In another embodiment, the guide rail is provided with a nozzle for spraying a liquid or gaseous spray medium. The fluid channel is embodied as a feed channel for feeding the liquid or gaseous spray medium to the nozzle. With such a spraying device, various additional functions may be realized in the linear transport system. These include, for example, a cleaning device for cleaning the guide rail, the conveyor or an object carried along by the conveyor with a water or compressed air jet, a disinfection device for objects transported with the conveyor, a lubrication device for the rollers of the conveyors, etc.

In a further embodiment, the guide rail comprises a hydraulic or pneumatic actuator, wherein the fluid channel is embodied as a supply channel for supplying a liquid or gaseous pressure medium to the hydraulic or pneumatic actuator. With such a fluidic actuator, various interactions with the conveyor or an object transported with it may be realized. In this way, the functionality of the linear transport system and its technical field of use may be expanded.

DETAILED DESCRIPTION

Figure 1:
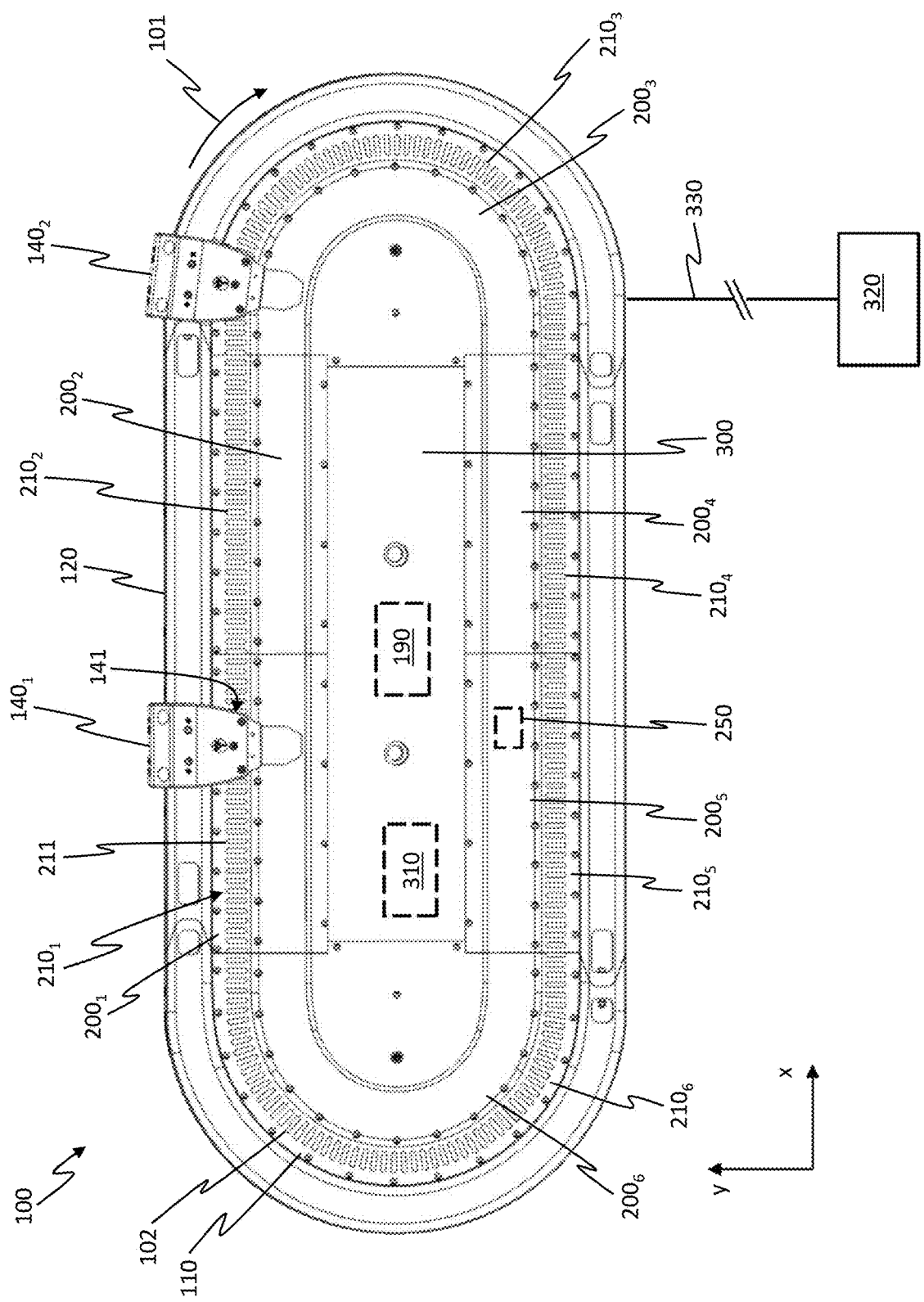
FIG. 1 shows a linear transport system having a linear motor constructed from a plurality of motor modules in the form of a closed loop with two conveying devices driven by a stator of the linear motor along a path of motion.

FIG. 1 shows an example of a linear transport system 100 comprising a linear motor 110, a guide rail 120 connected to it and two conveying devices $140_1$, $140_2$ movable on the guide rail 120 along a path of motion 101 predetermined by the guide rail 120. Depending on the application, the guide rail 120 may also be mounted independently of the motor modules 200 of the linear motor 110 and, for example, run alongside the motor modules 110. The linear motor 110 is mounted on a machine bed 300 which positions the linear motor 110 and the guide rail 120 in the desired way or spatially aligns them. As FIG. 1 further shows, the linear motor 110 is preferably divided up into a plurality of motor modules 200, which are connected to each other via corresponding interfaces. In addition to straight motor modules $200_1$, $200_2$, $200_4$, $200_5$, curved motor modules $200_3$, $200_6$ are used, as well, which enable the conveyors $140_1$, $140_2$ to move around curves. In this example, the various interconnected motor modules $200_1$, $200_2$, $200_3$, $200_4$, $200_5$, $200_6$ form a closed loop so that the conveyors $140_1$, $140_2$ may move in a circle.

To move the conveyors $140_1$, $140_2$ along the motion path 101, the linear motor 110 comprises a stator 111 having a large number of stator teeth 211 arranged side by side. During operation of the linear transport system 100, the stator 111 generates a travelling magnetic field by electric coils magnetically interacting with the conveyors $140_1$, $140_2$ or with magnetic devices 141 arranged thereon. With a suitable control of the electric coils, the position and movement of each conveyor $140_1$, $140_2$ along the path of motion 101 may be controlled individually.

As may be seen in FIG. 1, the stator 111 is composed of individual stators $210_1$, $210_2$, $210_3$, $210_4$, $210_5$, $210_6$ of the motor modules $200_1$, $200_2$, $200_3$, $200_4$, $200_5$, $200_6$ arranged side by side, whereby each stator $210_1$, $210_2$, $210_3$, $210_4$, $210_5$, $210_6$ comprises stator teeth 211 of the stator 111.

In addition to the components shown in FIG. 1, the linear transport system 100 typically also includes other equipment necessary for operation. These include, among others, equipment for control, communication and energy supply of the linear transport system 100 or its components. In a typical application the control of the linear transport system 100 is carried out by an external computer 320 which is connected to the linear transport system 100 via control and/or signal lines 330 (e.g. field bus). As indicated in FIG. 1 by dashed lines, certain supply devices 190, 250, 310 may also be located within the linear transport system 100, for example in the area of the machine bed 300 or within the motor modules 200.

Figure 2:
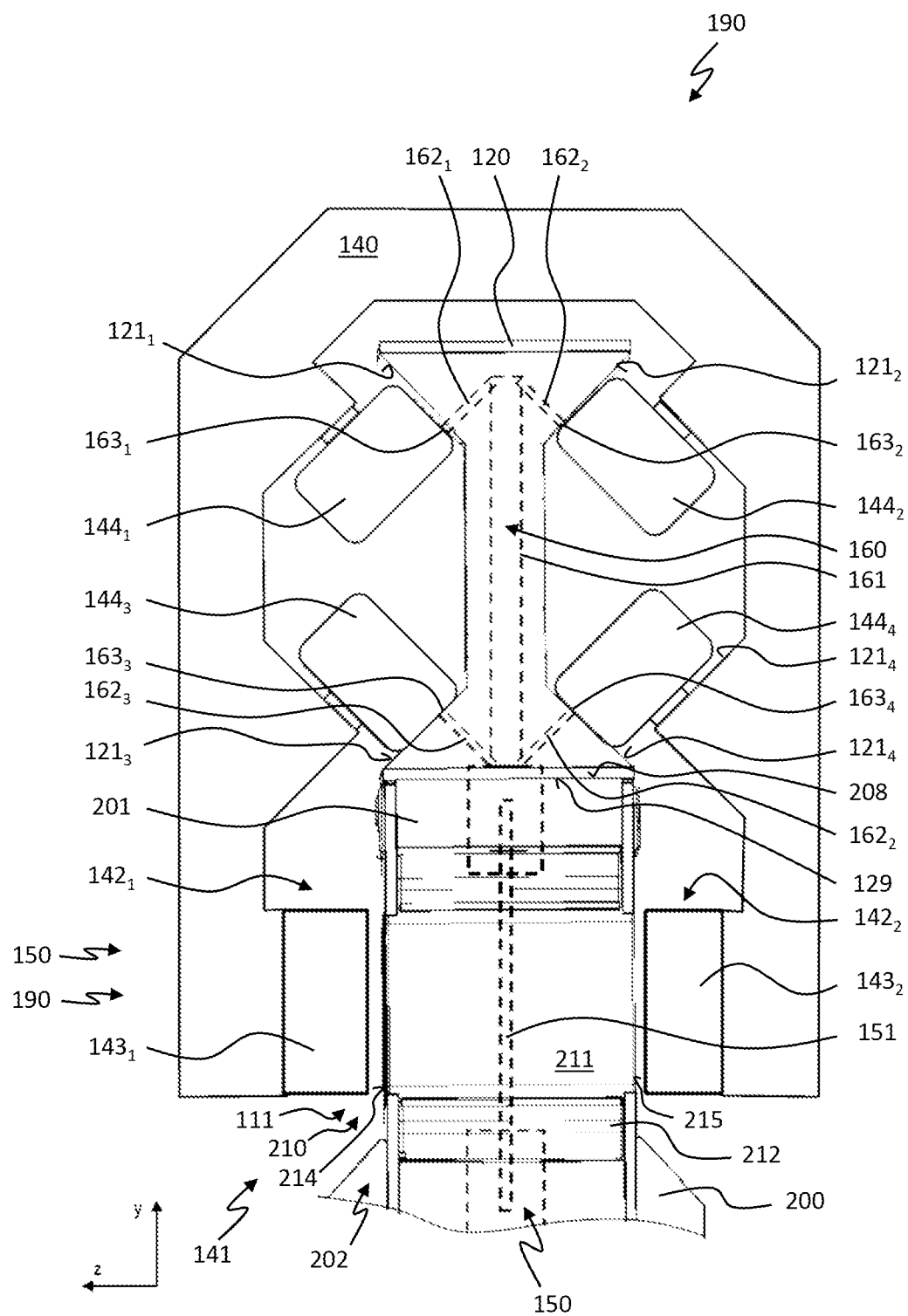
FIG. 2 shows a cross section in a plane perpendicular to the direction of transport through an upper part of a motor module and the guide rail with a conveying device arranged on the guide rail.

To illustrate the operation of the linear transport system 100, FIG. 2 shows a cross-sectional view through an upper part of the linear transport device 100 of FIG. 1. In the present example, the guide rail 120 has an elongated profile extending in y-direction with a total of four running surfaces $121_1$, $121_2$, $121_3$, $121_4$ inclined at an angle of approx. 45°. In this example, the guide rail 120 is mounted directly onto the motor module 200. Depending on the application, a differently arranged or mounted guide rail may also be used. For this purpose, the guide rail 120 has a mounting surface 129 arranged on its bottom side which, when the assembly shown in FIG. 2 is mounted, rests on a mounting surface 208 on the top side 203 of the motor module 200.

The conveying device 140 having a basic body 145 with a U-shaped profile in the present example is arranged on the guide rail 120 via a plurality of rollers $144_1$, $144_2$, $144_3$, $144_4$ so that it may be moved x in a direction perpendicular to the drawing plane. The rollers $144_1$, $144_2$, $144_3$, $144_4$ each lie on one of the four running surfaces $121_1$, $121_2$, $121_3$, $121_4$ of the guide rail 120 so that the conveyor is positioned in a defined manner opposite to the guide rail 120 and the motor module 200 arranged below it.

As already explained in connection with FIG. 1, the conveyor 140 has a magnet device 141 which magnetically interacts with the stator 111, the magnet device 141 comprising two magnet arrangements $142_1$, $142_2$, each with a plurality of permanent magnets $143_1$, $143_2$ arranged next to each other. As may further be seen in FIG. 2, the two magnet arrangements $142_1$, $142_2$ are arranged on both sides of the stator 111, with the permanent magnets $143_1$, $143_2$ of the magnet arrangements $142_1$, $142_2$ each facing each other in pairs. In this arrangement, the permanent magnets $143_1$ of the first magnet arrangement $142_1$ are each arranged at a small distance from the left front faces 214 of the stator teeth 211, while the permanent magnets $143_2$ of the second magnet arrangement $142_2$ are each located at a small distance from the right front faces 215 of the stator teeth 211.

As already described, the stator 210 also includes electric coils 220 wound around one stator tooth 211 each, which ensure magnetization of the stator teeth 211. The magnetic field emerging from the front faces of the respective stator teeth 211 interacts with the permanent magnets $143_1$, $143_2$ of the two magnet arrangements $142_1$, $142_2$. The forces acting on the permanent magnets $143_1$, $143_2$ and thus also on the entire conveyor 140 control the position and movement of the conveyor 140 along the guide rail 120. FIG. 2 shows the cross-section of an electric coil 220 wound around a stator tooth 211.

According to the present invention, the linear transport system 100 is provided with a special fluid system 150, which expands the functionality of the linear transport system 100. The fluid system 150 comprises fluid channels 151, 161, $162_1$, $162_2$, $162_3$, $162_4$ running inside of the motor module 200 and the guide rail 120 for transporting a fluid between the lower side of the motor module 200 and the upper side of the motor module towards the guide rail 120. The passage through the stator 210 of the motor module 200 is particularly critical due to the high packing density there. According to the invention, this problem is solved by a fluid channel 151 which is led through one of the stator teeth 211 of the stator 210. FIG. 2 shows a particularly advantageous embodiment of the fluid system 150, in which the fluid channels 151, 161, $162_1$, $162_2$, $162_3$, $162_4$ which are schematically represented here by a dashed line, are embodied as part of an automatically or manually operated lubrication system 190 for lubricating the running surfaces $121_1$, $121_2$, $121_3$, $121_4$ of the guide rail 120. Herein, a lubricant is transported via the fluid channel 151 arranged in the stator tooth 211 into the distribution channel 161 formed in the guide rail 120. From here, the lubricant is conveyed by the distribution channels $162_1$, $162_2$, $162_3$, $162_4$ to the running surfaces $121_1$, $121_2$, $121_3$, $121_4$ of the guide rail 120, where it is discharged via corresponding outlet openings $162_1$, $162_2$, $162_3$, $162_4$ and, during operation of the linear transport system 100, is distributed on the running surfaces $121_1$, $121_2$, $121_3$, $121_4$ by the passing rollers $144_1$, $144_2$, $144_3$, $144_4$ of the conveyor 140.

Figure 3:
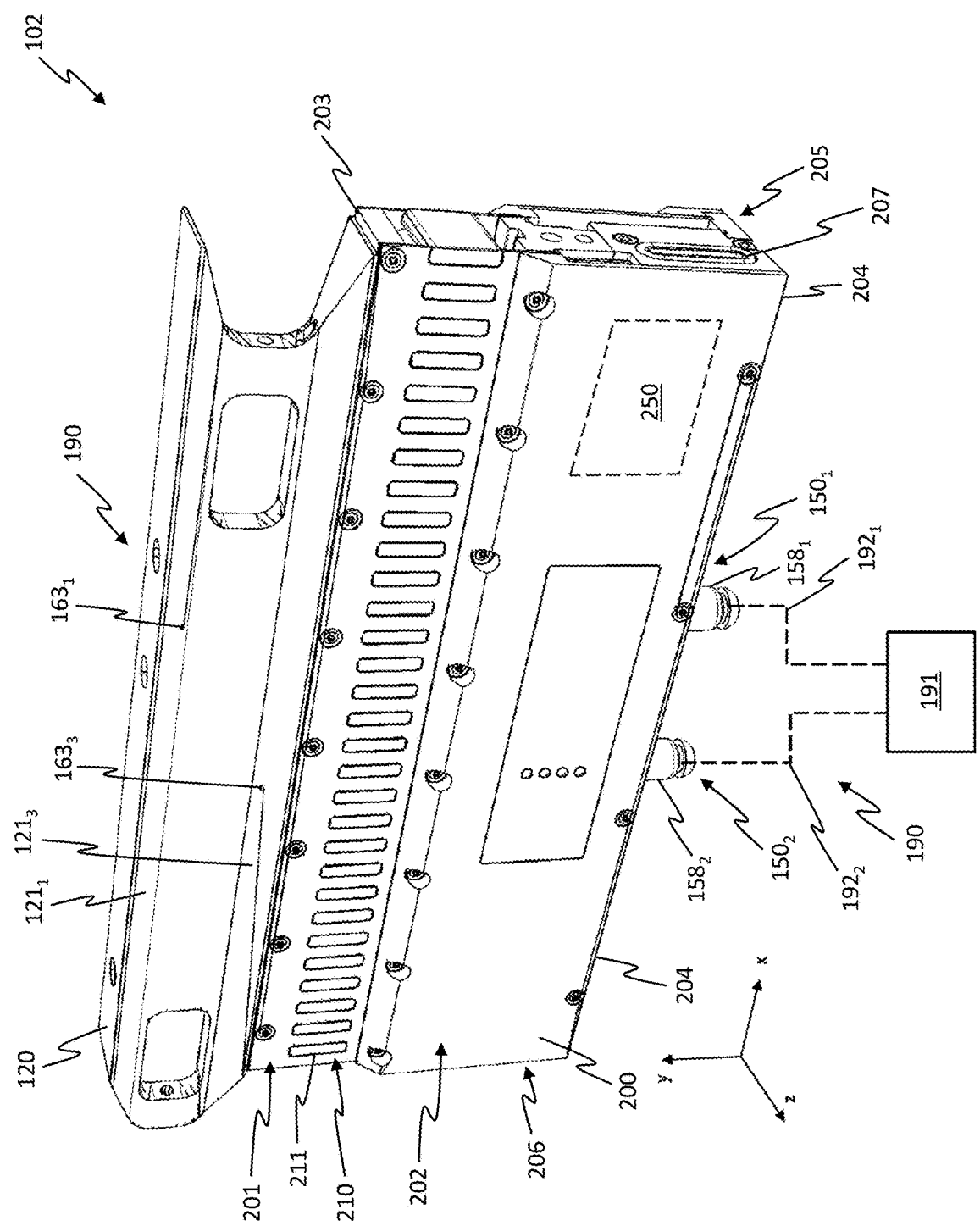
FIG. 3 is a perspective view of a motor module with a guide rail mounted on it.

FIG. 3 shows a perspective view of an assembly 102 of the linear transport system 100 shown in FIG. 1, which is made up of a motor module 200 and a section of the guide rail 120 placed on it, and which is equipped with the lubrication system 190 described above. In this example, the upper running surfaces $121_1$, $121_2$ and the lower running surfaces $121_3$, $121_4$ of the guide rail 120 are lubricated separately from each other via two fluid systems $150_1$, $150_2$ running independently of each other within the guide rail 120 and the motor module 200. Accordingly, the motor module 200 has two separate fluid connections $158_1$, $158_2$ on its underside 203, to each of which one of two supply lines $192_1$, $192_2$ of a supply unit 191 of the lubrication system 190, shown here by a dashed line, is connected. The supply device 191 may in principle be any suitable device for pumping the lubricant, such as an automatic pumping device or a manually operated grease gun.

By using separate fluid systems $150_1$, $150_2$ for lubrication of the running surfaces $121_1$, $121_2$, $121_3$, $121_4$ of the guide rail 120, it is possible to lubricate the running surfaces $121_1$, $121_2$, $121_3$, $121_4$ independently. This may e.g. be achieved by different lubrication intervals which are adapted to the individual lubrication requirements of the running surfaces $121_1$, $121_2$, $121_3$, $121_4$. In addition, two independently operating lubrication systems may be realized which work with different lubricants. In principle, other embodiments may also be provided in which the running surfaces $121_1$, $121_2$, $121_3$, $121_4$ are also lubricated in combinations other than those shown herein via shared fluid systems 150.

As further shown in FIG. 3, the motor module 200 has interfaces 207 on its front faces 205, 206 for connection to further motor modules of the linear transport system 100. As further indicated by a dotted line, the lower part 202 of the motor module 200 may also contain further supply units 250 of the linear transport system 100 which are necessary for operation.

Figure 4:
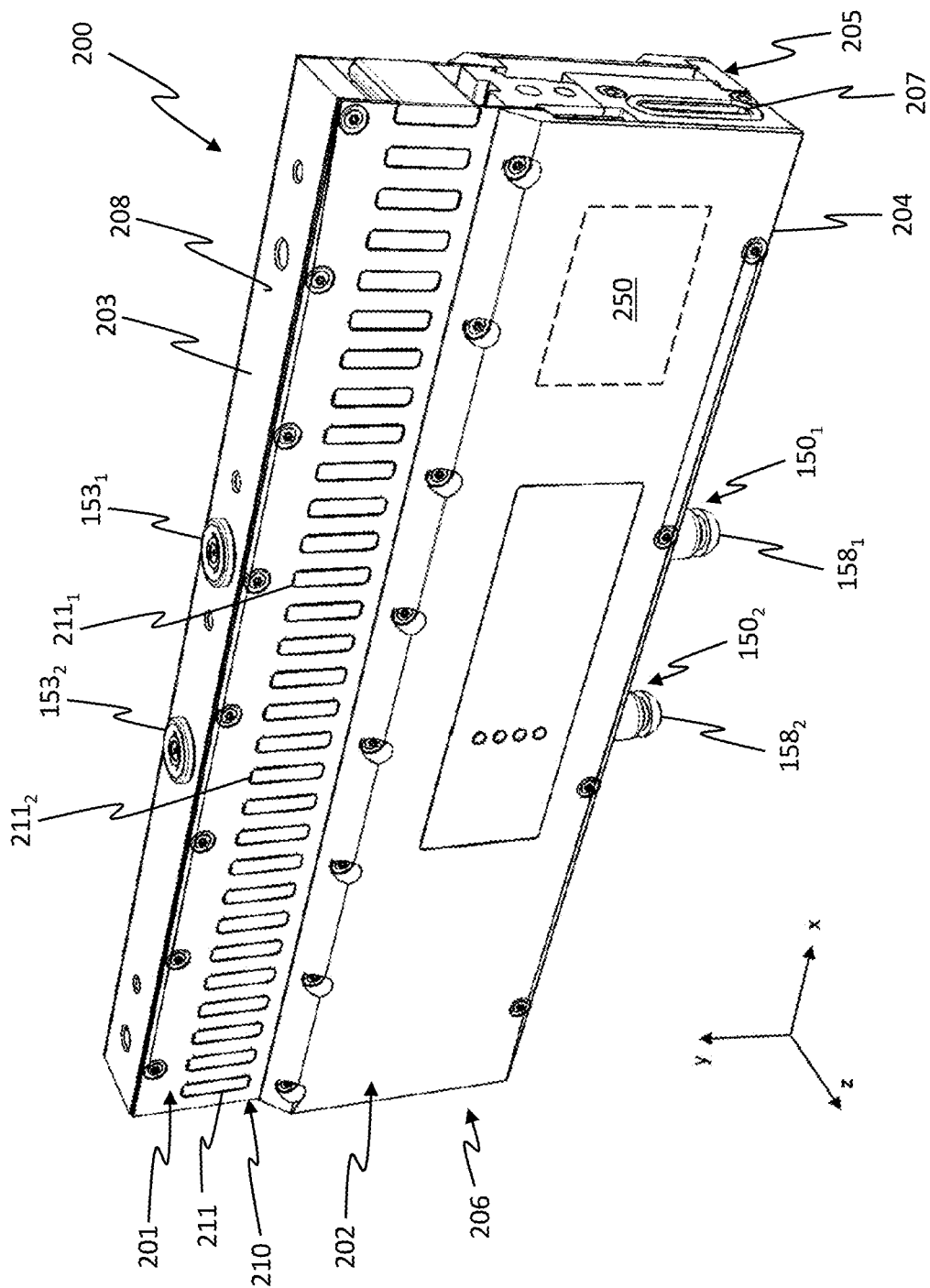
FIG. 4 depicts a perspective view of the motor module from FIG. 3 without the guide rail.

FIG. 4 shows the motor module 200 of assembly 102 shown in FIG. 3 without the guide rail 120. It becomes obvious that there are two fluid connections $153_1$, $153_2$ of the two fluid systems $150_1$, $150_2$ running inside the motor module 200 on the upper side 203 of the motor module 202 which are embodied as interfaces for connecting corresponding fluid channels $160_1$, $160_2$ integrated in the guide rail 120. With an alternatively embodied linear transport system, the guide rail cannot be mounted directly on the motor modules 200, but may run next to the motor modules 200. The components used to implement the additional functions, such as a lubricant outlet, a fluidic actuator 171 of the actuator device 170 or a nozzle 181 of the spray device 180, may also be mounted directly on the motor modules 200 themselves or integrated into the motor modules 200.

Figure 5:
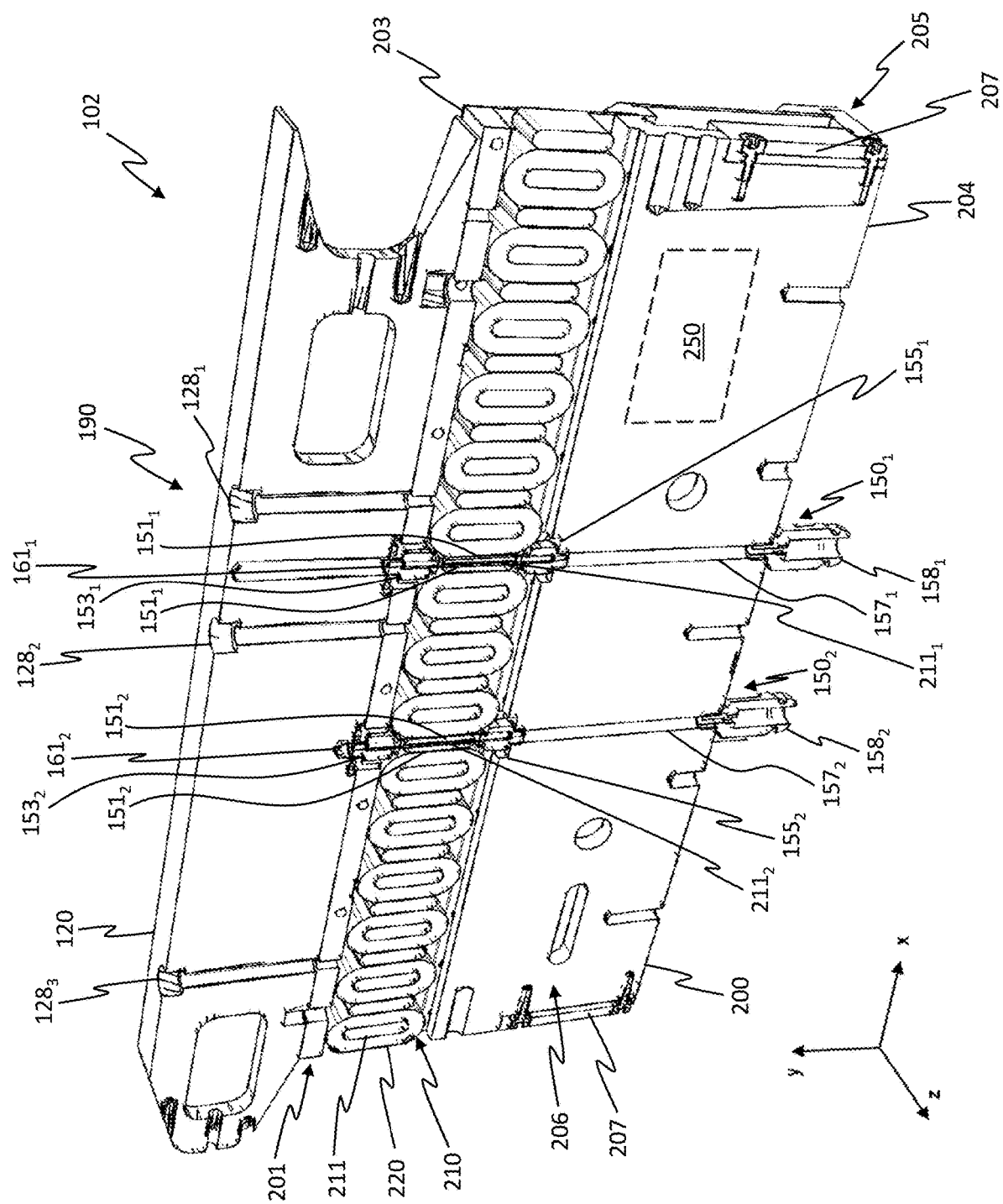
FIG. 5 shows a longitudinal cross-section of the motor module assembly shown in FIG. 3 and the guide rail mounted on it.

To illustrate the structure of the two fluid systems $150_1$, $150_2$ running inside the motor module 200 and the guide rail 120, FIG. 5 shows a cross-section of the assembly 102 shown in FIG. 3 in the x-y plane. As may be seen here, each of the two fluid connections $158_1$, $158_2$ arranged on the bottom side 204 of the motor module 200 ends in a separate fluid channel $157_1$, $157_2$, respectively, which runs through the lower part or, respectively, section 202 of the motor module 200 facing away from the guide rail 120 and opens into an internal fluid connection $155_1$, $155_2$ on the underside of the stator 210. The further course of the fluid systems $150_1$, $150_2$ is formed by two fluid channels $151_1$, $151_2$, each running through an unwound stator tooth $211_1$, $211_2$, which transfer the lubricant from the lower part 202 of the motor module 200 facing away from the guide rail 120 to the upper part 201 of the motor module 200 facing the guide rail 120. Via the fluid connections $153_1$, $153_2$ located on the top 203 of the motor module 200, the lubricant finally reaches the two fluid channels $161_1$, $161_2$ running in the guide rail 120.

As further illustrated in FIG. 5, the guide rail 120 also comprises three continuous bores $128_1$, $128_2$, $128_2$ to accept screws that secure the guide rail 120 to the top 203 of the motor module 200.

Figure 6:
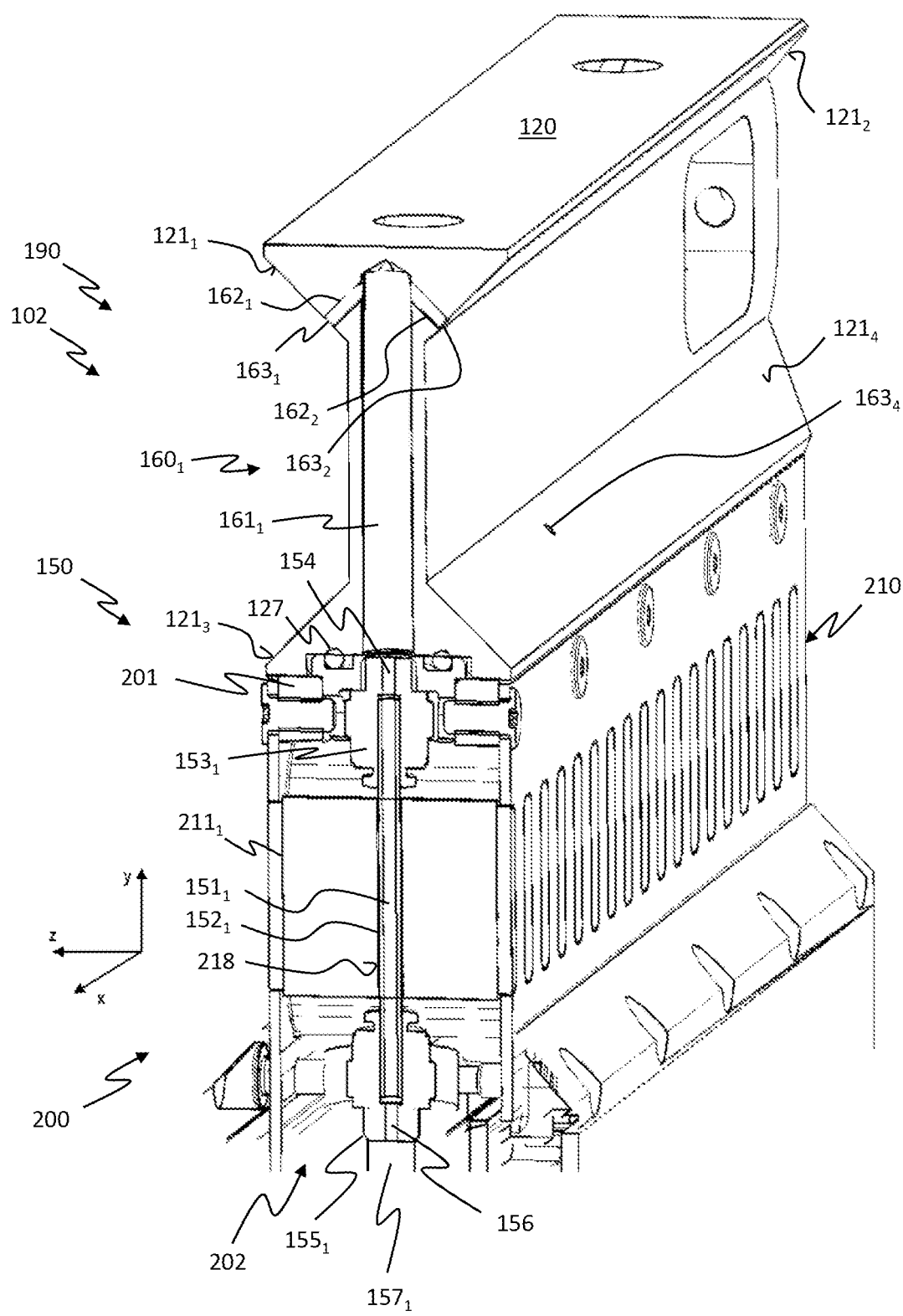
FIG. 6 shows a cross-section through an upper part of the motor module and guide rail assembly shown in FIG. 3 in the area of the first lubrication channel.

FIG. 6 shows a cross-section in the y-z plane through the assembly 102 shown in FIG. 3 at the level of the first channel system $150_1$. Here, it becomes obvious that the fluid channel $151_1$ running through stator tooth $211_1$ is formed by a small tube $152_1$ arranged in a bore 218 passing through stator tooth $211_1$. The tube $152_1$ which is preferably a capillary tube made of stainless steel or other suitable material is inserted with its lower end into a bore 156 of the fluid connection $152_1$ arranged on the bottom side of the stator 210. The tube $152_1$ is inserted with its upper end in a bore 154 passing through the upper fluid connection $153_1$, which opens directly into the central fluid channel $161_1$ located above it in the channel system $160_1$ formed in the guide rail 120. The central fluid channel $161_1$ directs the lubricant to two fluid channels $162_1$, $162_2$, which are arranged in the upper part of the guide rail 120 and serve as distribution channels. These channels direct the lubricant to the two upper running surfaces $121_1$, $121_2$, where the lubricant is discharged directly onto the running surfaces $121_1$, $121_2$ via the two outlet openings $163_1$, $163_2$.

To ensure sufficient tightness, the interface between the upper fluid connection $153_1$ of the motor module 200 and the central fluid channel $161_1$ of the guide rail 120 must be adequately sealed. In the present example, this is done by a sealing ring 127.

Figure 7:
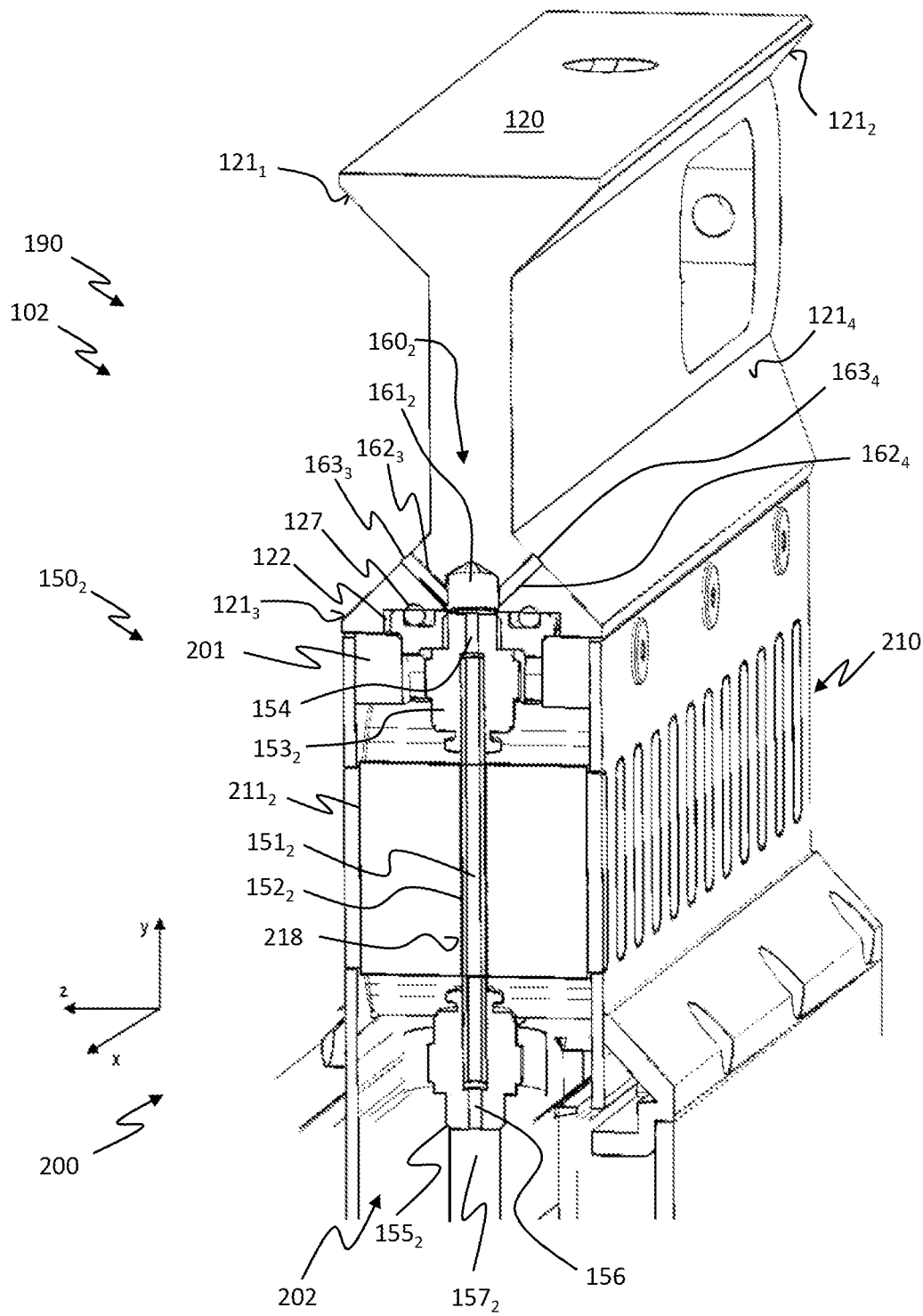
FIG. 7 shows a cross section through an upper part of the motor module and guide rail assembly shown in FIG. 3 in the area of a second lubricant channel.

FIG. 7 shows a cross-section in the y-z plane through the assembly 102 shown in FIG. 3 at the level of the second channel system $150_2$. The structure of the arrangement is essentially identical to the arrangement described in connection with FIG. 6. The main difference is the channel system $160_2$ running in the guide rail 120, which now distributes the lubricant to the lower two running surfaces $121_3$, $121_4$ of the guide rail 120. For this reason, the central fluid channel $161_2$ has a much lower height than the fluid channel $161_1$ described in FIG. 6. Two distribution channels $163_3$, $163_4$ are connected to the central fluid channel $161_2$ which distribute the lubricant to the two lower running surfaces $121_3$, $121_4$ of the guide rail 120. The lubricant is discharged through the outlet openings $163_1$, $163_2$ formed in the running surfaces $121_3$, $121_4$.

With a fluid system 150 guided through the motor module 200, the linear transport system 200 may be equipped with integrated lubrication and other additional functions. These include hydraulically or pneumatically operated actuator systems or applications in which a liquid or gaseous medium is sprayed in the area of the guide rail 120 or the conveyor 140.

Figure 8:
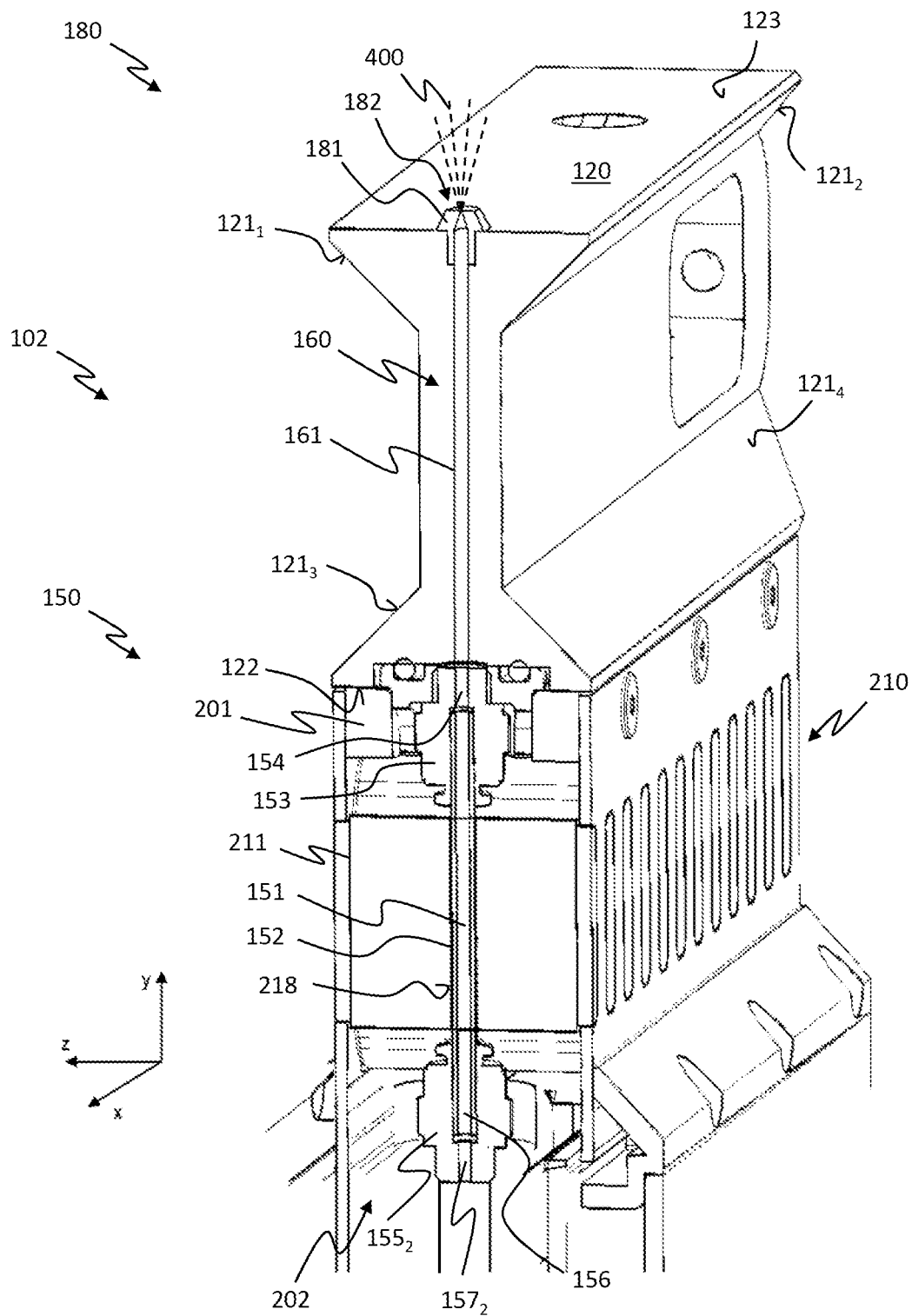
FIG. 8 is a cross-section through an upper part of an assembly consisting of the motor module and a guide rail with a spray device arranged in an upper area of the guide rail.

In this context, FIG. 8 shows an alternative embodiment of the linear transport system 100, in which a spraying device 180 for spraying a liquid or gaseous spray medium 400 within the guide rail 120 is realized by the fluid system 150 running through the motor module 200 and the guide rail 120. In the present example, the spraying device 180 comprises a nozzle 181 arranged on the top side 123 of the guide rail 120, which is arranged at an upper end of a fluid channel 161 passing through the guide rail 120 from its bottom side 123 to its top side 123. To the nozzle 181, the fluid channel 161 serves as a supply channel for the spray medium 400 supplied via the upper fluid connection 174 of the motor module 200 arranged below. In the present embodiment example, the nozzle 181 has an upwardly directed nozzle opening 182 through which the spray medium 400 is sprayed onto the conveyor 140 or an object transported with the conveyor 140. Spraying of the spray medium 400 may be used for cleaning, disinfecting, preserving, painting, moistening the sprayed object or conveyor or for any other purpose. The spraying medium 400 may be any suitable liquid or gas (e.g. water, air, detergent, preservative, disinfectant, paint, etc.)

Figure 9:
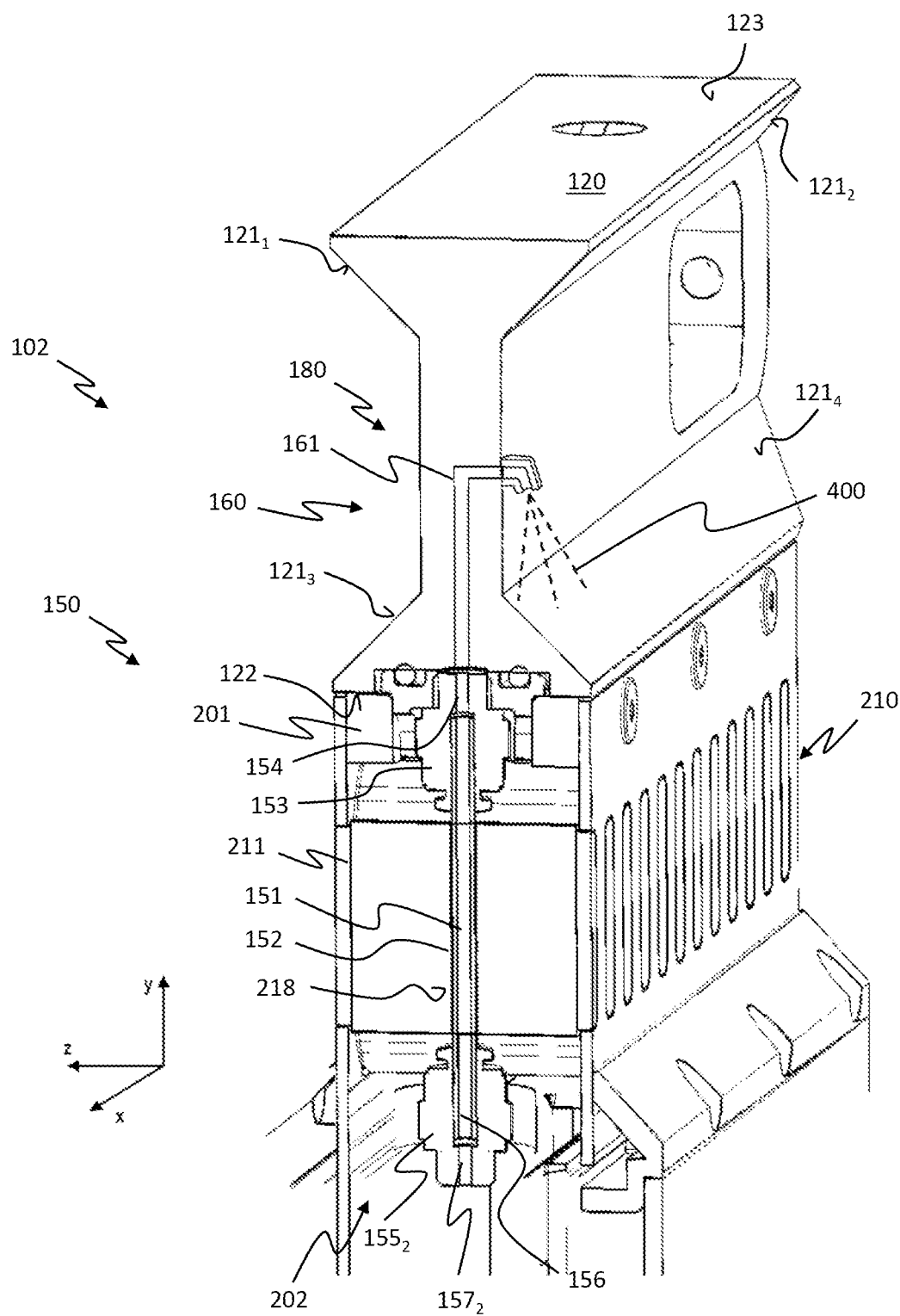
FIG. 9 shows a cross section through an upper part of an assembly consisting of the motor module and a guide rail with a spray device arranged in a central area of the guide rail.

In principle, however, a spraying device may also be provided at another location on the guide rail 120, for example to clean the running surfaces of the guide rail 120 or the rollers of the conveyor 140 from chips or other dirt. For this purpose, FIG. 9 shows an alternative embodiment of the spraying device 180, which is embodied to spray a spray medium 400 onto a lower running surface $121_4$ of the guide rail 120 or onto a roller $144_4$ of the conveyor 140 located in the area of the lower running surface $121_4$. In this example, the spraying device 180 comprises a nozzle 181 arranged in a central section of the guide rail 120, the nozzle opening 182 of which is directed towards the lower running surface $121_4$. In principle, a spraying device 180 may also be provided which sprays the spraying medium 400 simultaneously onto a plurality of running surfaces $121_1$, $121_2$, $121_3$, $121_4$ of the guide rail 120 or a plurality of running rollers $144_1$, $144_2$, $144_3$, $144_4$ of the conveyor 140.

Figure 10:
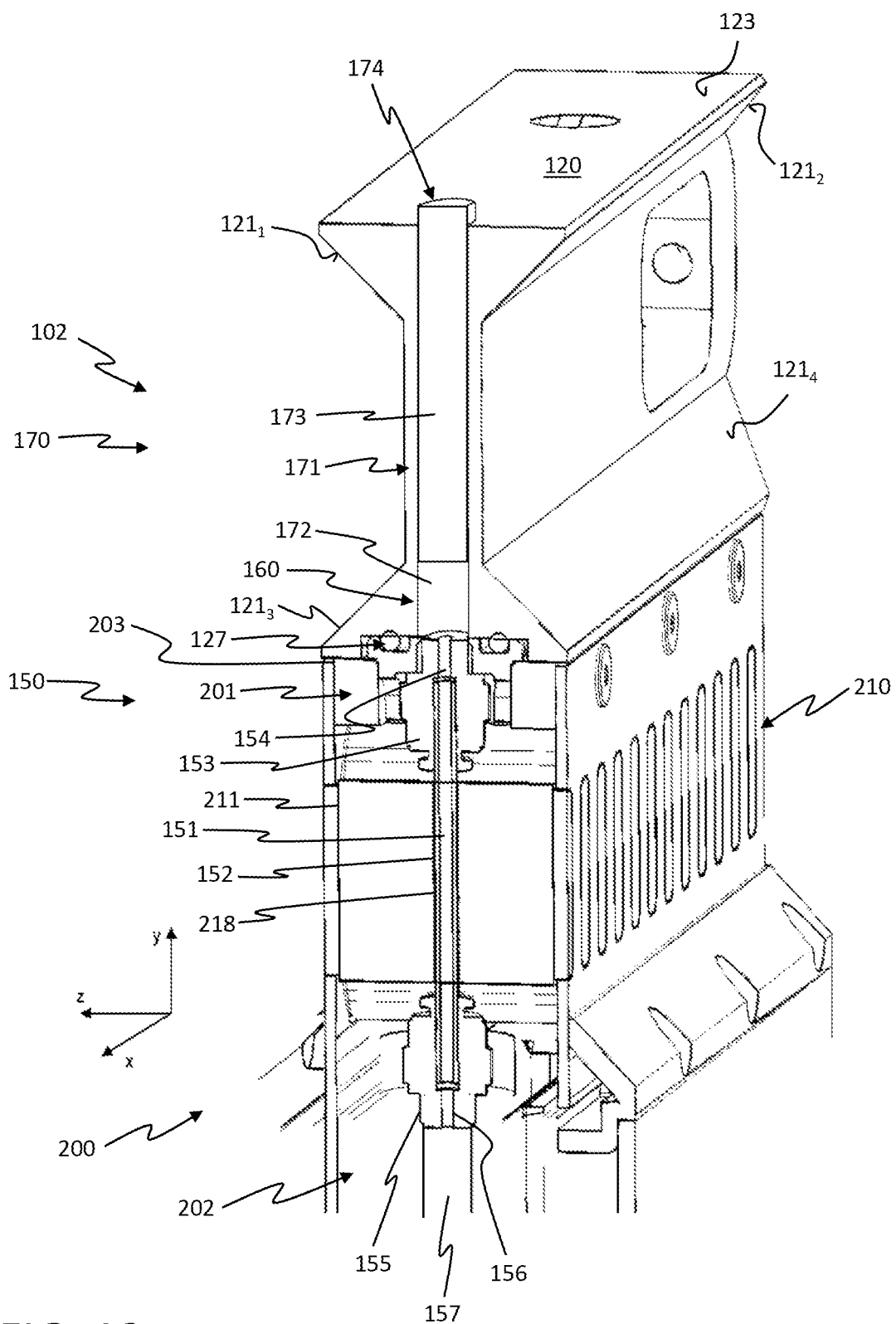
FIG. 10 depicts a cross-section through an upper part of an assembly consisting of the motor module and a guide rail with a hydraulic actuator device.

As already described above, the fluid system 150 running through the motor module 200 may also be used to implement additional functions of the linear transport system 100. An example of this is the alternative embodiment of the linear transport system 100 shown in FIG. 10, in which an actuator device 170 with a fluidic actuator 171 arranged in the guide rail 120 is realized by the fluid system 150 running through the motor module 200 and the guide rail 120. The fluidic actuator 171 which may be a hydraulically or pneumatically operated actuator in this example comprises a cylindrical piston 173, which is movably arranged in a correspondingly shaped cylinder 172. The cylinder 172 is formed by a bore open to the top side 123 of the guide rail 120, which fluidically communicates with the fluid connection 153 located on the upper side 203 of the motor module 200 in the lower part of the guide rail 120. During operation of the actuator device 170, a pressure medium fed via the fluid channel 151 of the stator 210 into the lower part of the cylinder 172 causes an increase in pressure in this area, causing the cylindrical piston 173 to move out of the cylinder formed by the bore 120. Analogously, a lowering of the pressure in the lower part of the cylinder 172, which may be done by discharging the pressure medium via the fluid channel 151, results in a retraction of the cylindrical piston 100 into the cylinder 172. As a result of this movement, the cylindrical piston 173 may interact mechanically with the conveying device 140 or an object transported by it via its upper front face 174 or a component arranged thereon. This interaction allows various functions to be realized, e.g. a mechanical processing function on an object attached to the conveyor 140 or a mechanical braking or holding function for the conveyor 140. In principle, the fluidic actuator device 180 may also be realized in a different way within the guide rail 120. For example, one or more fluidic actuators may also be arranged in the area of the running surfaces $121_1$, $121_2$, $121_3$, $121_4$ of the guide rail 120, e.g. to interact mechanically with the rollers $144_1$, $144_2$, $144_3$, $144_4$ of the conveyor 140.

Figure 11:
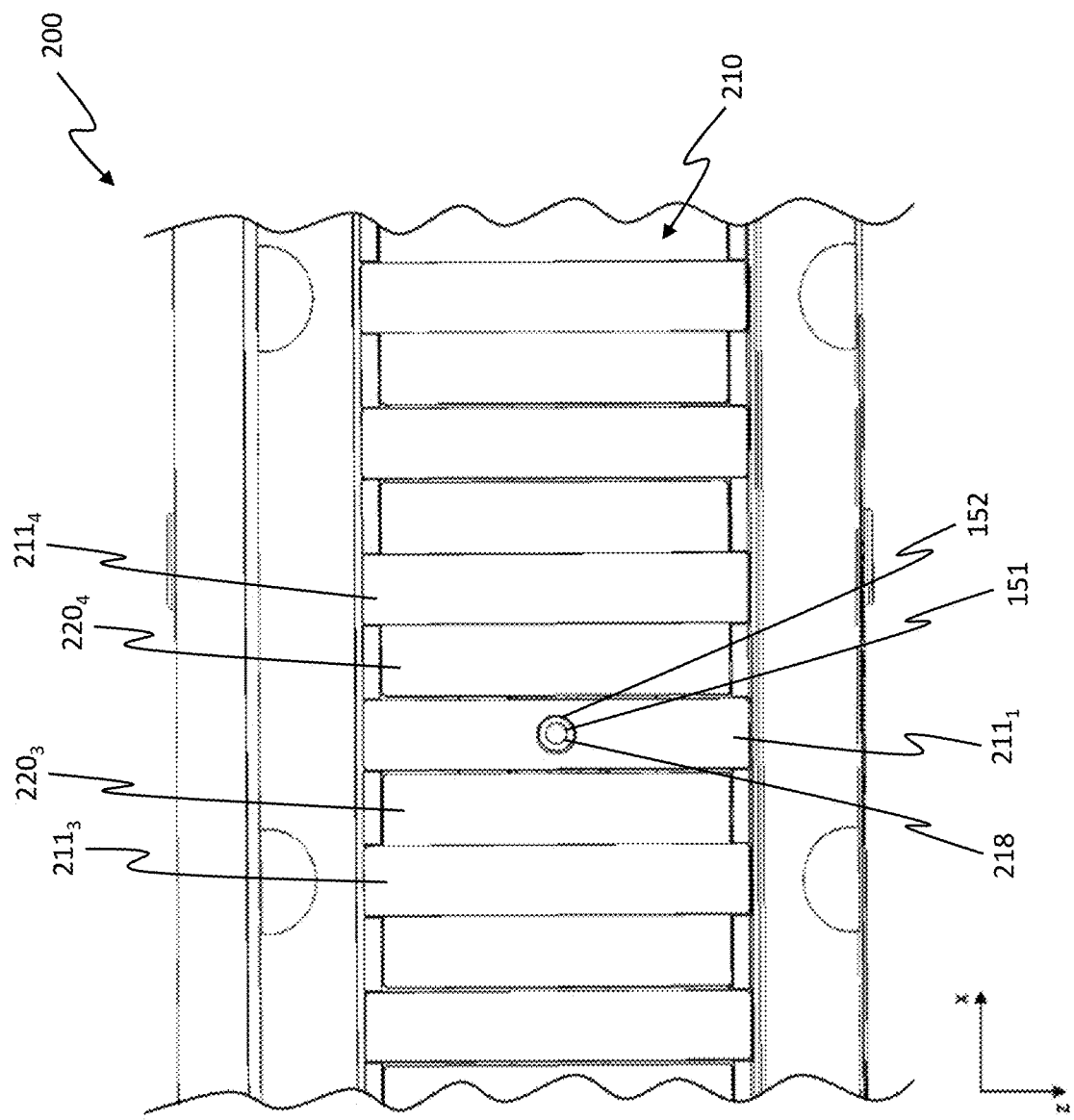
FIG. 11 shows a cross-section through the stator of the motor module with a stator tooth containing an internal fluid channel.

As described in connection with the previous figures, a fluid system 150 integrated in the motor module 200 opens up the possibility of providing various additional functions for the linear transport system 100. An essential basis for these applications is the fluid channel 151 which is guided through the stator 210 and connects a lower part 201 of the motor module 200 with an upper part 201 of the motor module 200. Thereby, the fluid channel 151 may in principle be embodied in various ways within the stator assembly 210. So far, the fluid channel 151 was formed in each case by a round tube 152 arranged in a bore 218 vertically crossing an unwound stator tooth 211. Such a fluid channel 151 is also shown in FIG. 11, which is a cross-sectional representation in the x-z-plane through the stator 210 of the motor module 200 shown in FIG. 4. Herein, it can be seen that the stator tooth $211_1$ which houses the fluid channel 151 is arranged between two stator teeth $211_3$, $211_4$, each of which is wound by an electric coil $220_3$, $220_4$, but the stator tooth $211_1$ in question does not have its own electric coil.

Figure 12:
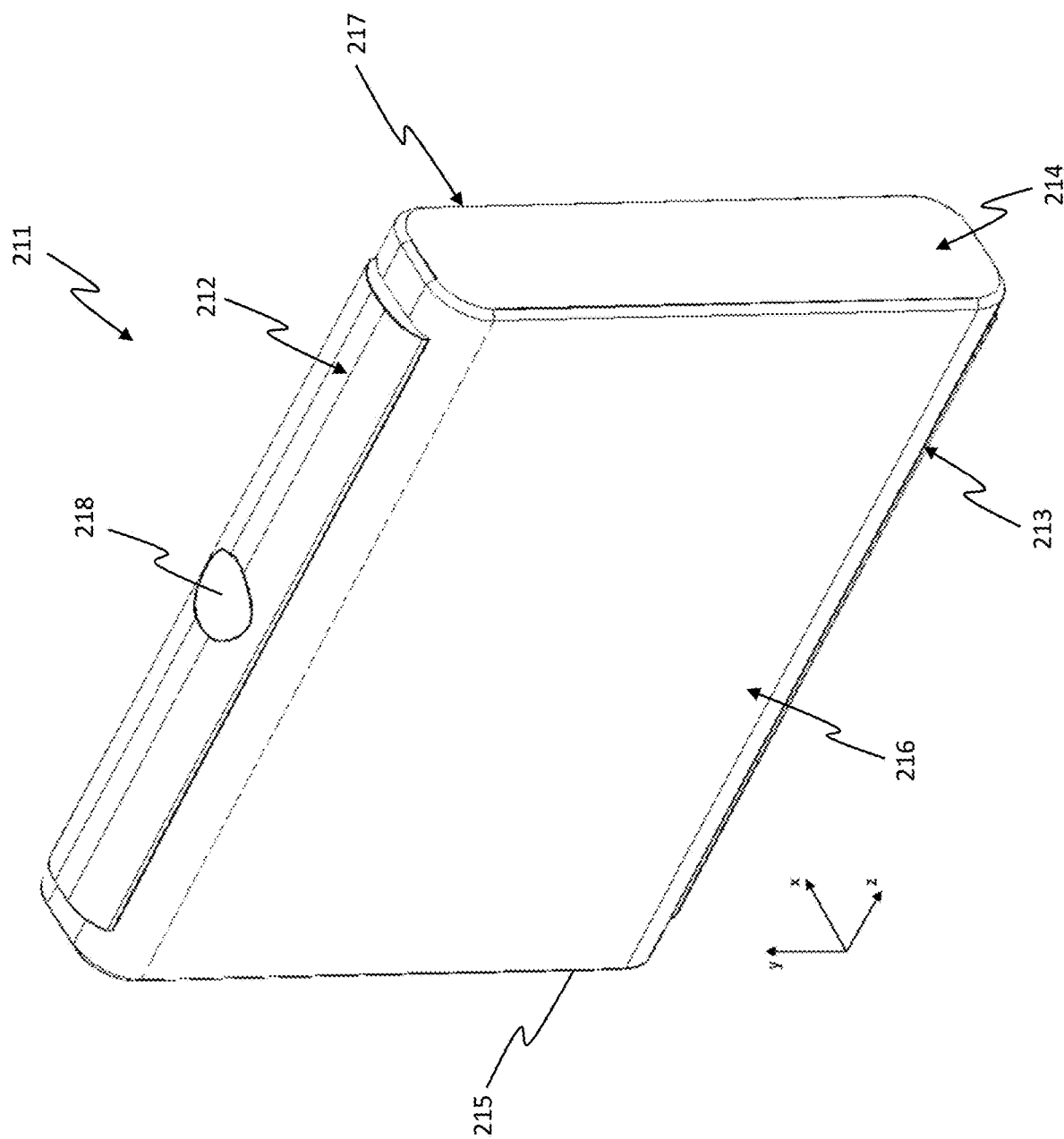
FIG. 12 is a perspective view of a stator tooth with a central bore.

FIG. 12 shows the stator tooth $211_1$ of FIG. 11 with a bore 218 passing through stator tooth $211_1$ from its top side 212 to its bottom side 213.

Figure 13:
FIG. 13 is an alternative embodiment of the stator tooth with a fluid channel elongated in a magnetizing direction of the stator tooth.
Figure 13:
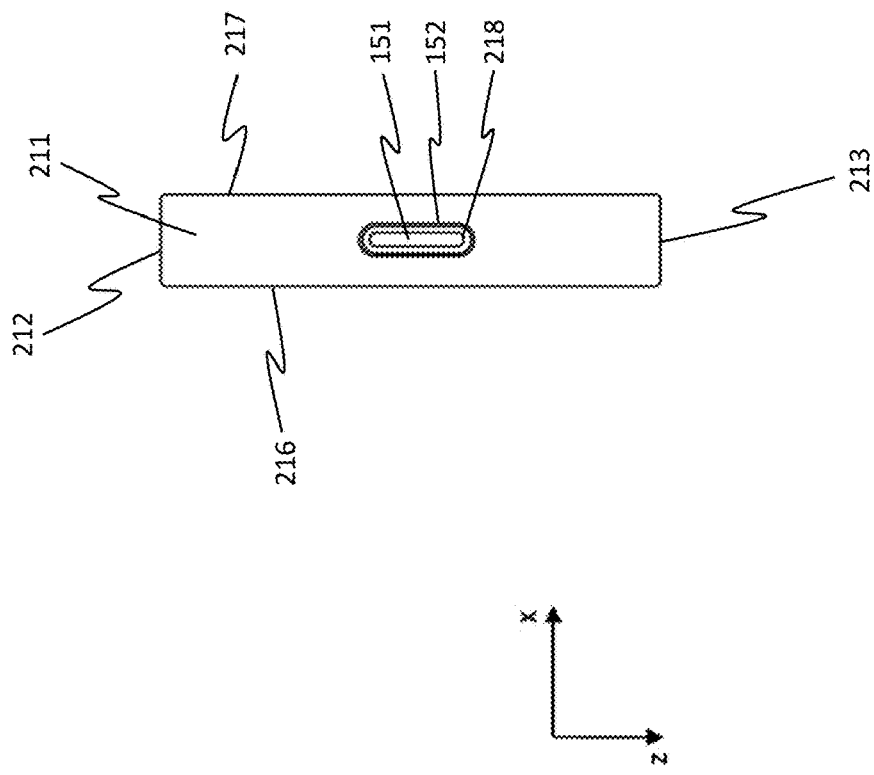

As the width of a stator tooth 211 of a typical linear transport device 100 is only a few millimeters (e.g., 4 mm), the bore 218 can also only have a correspondingly small diameter (e.g., 2 mm). Thus, the tube 152 arranged in the bore 218 is preferably a capillary tube. In this embodiment, in spite of the fact that the wall thickness of the capillary tube 218 should be as thin as possible, the fluid channel 151 only has a small diameter (e.g. 1 mm). In order to enable a higher flow rate of the fluid through the fluid channel 151 or to achieve a smaller width of the fluid channel 151 and thus of the capillary tube 152 while maintaining the same cross-sectional area of the fluid channel 151, a tube 151 with a flattened profile may be selected instead of a round capillary tube 152, the diameter of which is larger in the magnetizing direction z of the stator tooth 211 than its diameter in the direction x orthogonal to it. FIG. 13 shows a stator tooth 211 with a correspondingly shaped fluid channel 151.

Figure 14:
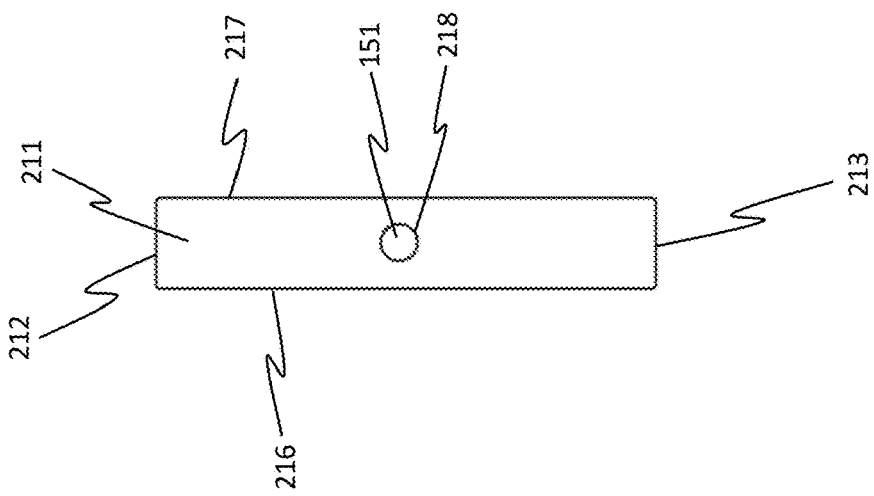
FIG. 14 shows another alternative embodiment of the stator tooth having a fluid channel consisting of a bore.

Depending on the application, it may also be possible to form the fluid channel 151 in the stator tooth 211 without a corresponding capillary tube 152. FIG. 14 shows a corresponding fluid channel 151 formed in a stator tooth 211. In order to prevent contact between the material of stator tooth 211 and any corrosive substances and to prevent associated corrosion of the stator tooth 211 inside the bore 218, a suitable coating may be formed on the inside of the bore.

Figure 15:
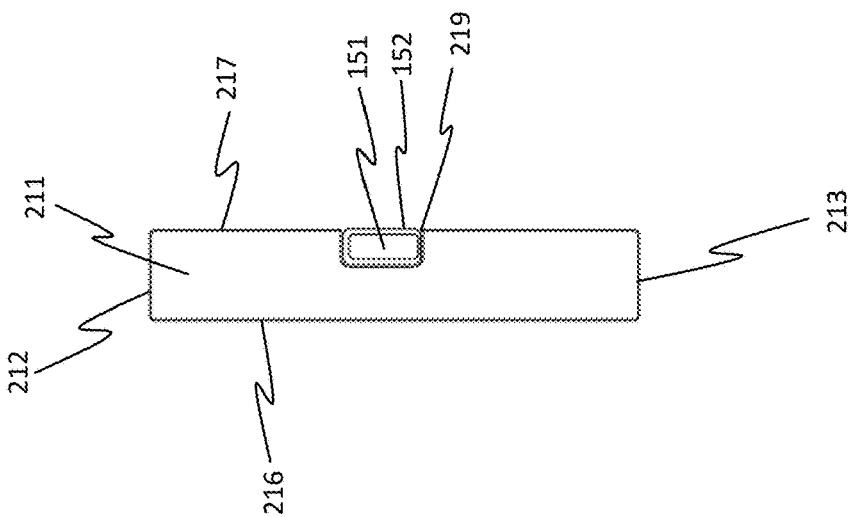
FIG. 15 is a further alternative embodiment of the stator tooth having a round fluid channel arranged in a lateral groove of the stator tooth.

As an alternative to a bore 218 running through stator tooth 211, a groove 219 formed in a side wall 216, 217 of stator tooth 211 may also be provided to accommodate tube 152 which is preferably embodied as a capillary tube. FIG. 15 shows a correspondingly shaped stator tooth 211. As may be seen herein, the groove in this example has a rounded profile corresponding to the round profile of tube 152.

Figure 16:
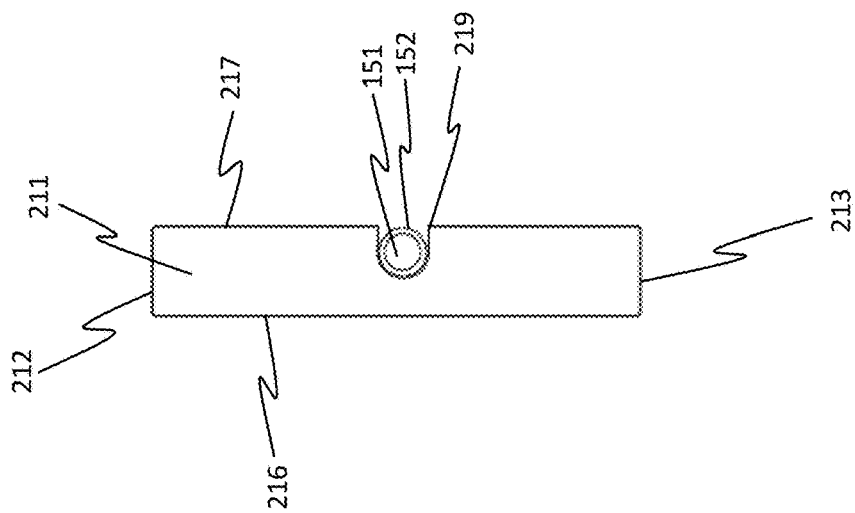
FIG. 16 shows another alternative embodiment of the stator tooth having a fluid channel arranged in a lateral groove of the stator tooth and elongated in the magnetizing direction of the stator tooth.

In principle, a flattened tube 152 may also be used in conjunction with the groove 219 to reduce the depth of the incision formed by the groove 219 or, with the same depth of the groove-shaped incision 219, to achieve a larger cross-sectional area of the fluid channel 151 formed by the tube 219. FIG. 16 shows a stator tooth 211 having a tube 152 extended in the magnetizing direction z of the stator tooth 211. A further increase in the cross-sectional area of the fluid channel 151 or, respectively, a further reduction in the depth of the groove 219 accommodating the tube 152 may be achieved by using a tube 152 with a nearly rectangular profile. The production of a groove 219 with a correspondingly rectangular profile is particularly easy, for example, by using a milling machine.

Figure 17:
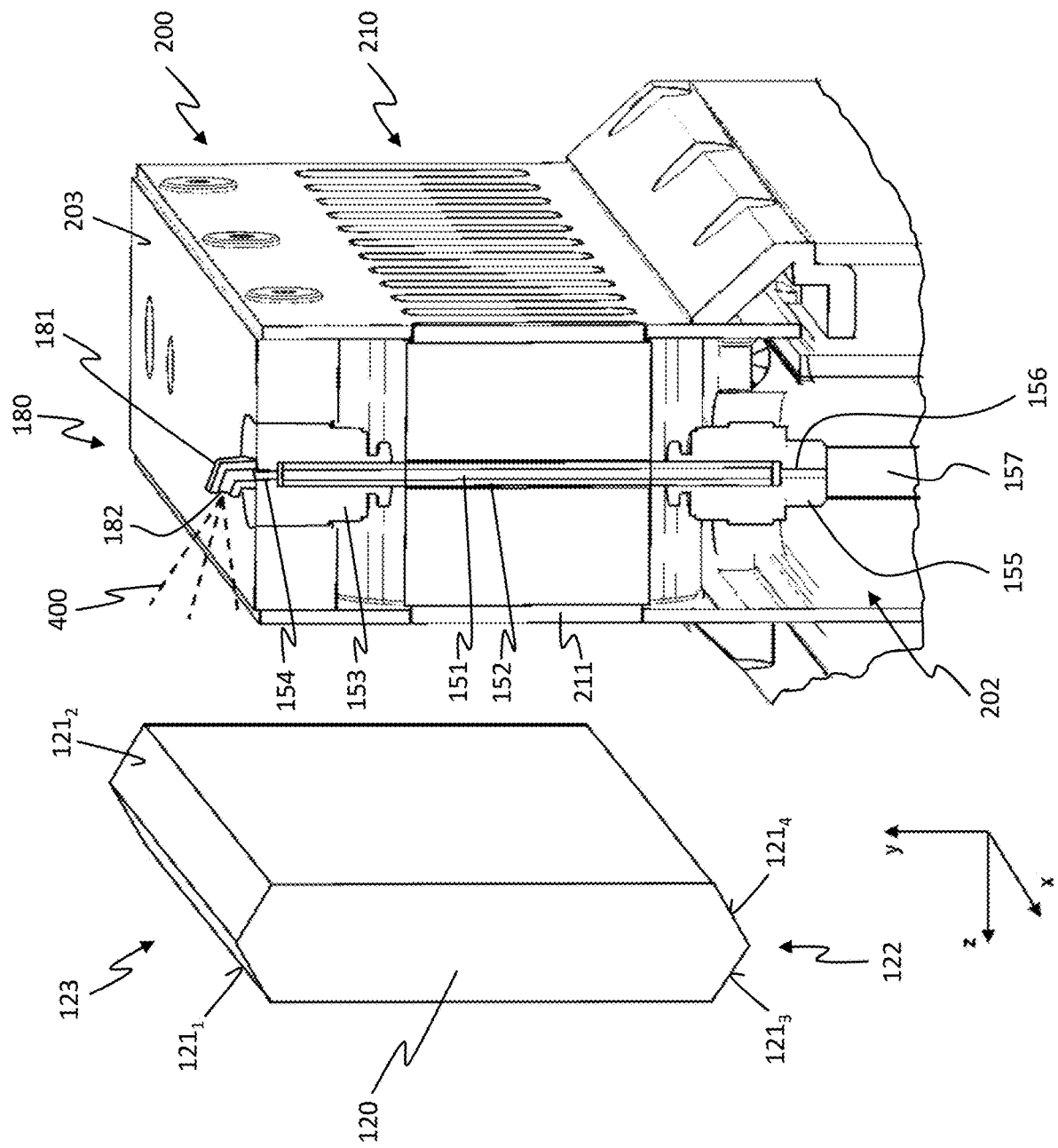
FIG. 17 shows a cross-section through a motor module and a guide rail running parallel thereto, the motor module having a spray device on its upper side with a nozzle oriented in the direction of the guide rail.

In the preceding embodiment examples, a guide rail 120 mounted on the top side 203 of each of the motor modules 200 is shown. In principle, however, the guide rail 120 may also be mounted in a different way, e.g. as a guide rail 120 running laterally alongside to the motor modules 200. For this purpose, FIG. 17 shows a corresponding arrangement with a motor module 200 and a guide rail 120 running laterally and parallel to it. The guide rail 120 can, for example, be mounted directly onto the machine bed 300 (see FIG. 1). In the present embodiment example, the guide rail 120 has four surfaces $121_1$, $121_2$, $121_3$, $124_4$, each tilted at a defined angle, which serve as running surfaces for rollers of a conveying device 140.

As is furthermore shown in FIG. 17, the top side 203 of the motor module 200 comprises a nozzle 181 of a spraying device 180 for spraying a spray medium 400. In this example, the nozzle 181 has a nozzle opening 182 directed to the side for spraying the spray medium 400 in the direction of the guide rail 120 or a conveyor arranged on it. In the present example, the nozzle is mounted directly on an upper fluid connection 153 of the motor module 200 into which the fluid channel 151 running through the stator tooth 211 opens. In principle, however, nozzles arranged or mounted differently may also be realized here. In addition to the spray device 180 shown here, other additional functions of the linear transport system may also be realized directly on or in the motor module 200, such as a pneumatic or hydraulic actuator device with a fluid actuator arranged on the motor module 200 or integrated in the motor module 200.

In the above embodiment examples, stator teeth 211 are shown with only one integrated fluid channel 151. In principle, however, stator teeth 211 containing more than one integrated fluid channel 151, respectively, are conceivable, as well.

Furthermore, in the preceding embodiment examples, only one guide rail 120 having a specially shaped cross-sectional profile forming a total of four running surfaces $121_1$, $121_2$, $121_3$, $124_4$ is shown. In principle, however, it is also possible to use guide rails with a different cross-sectional profile and with a different number of running surfaces. In such a case, the guide rail 120 contains a fluid system 160 which is adapted to the changed geometry.

Although the present invention was illustrated and described in detail by the preferred embodiment examples, the invention is not limited by the disclosed examples. Rather, other variations may be devised by a person skilled in the art without exceeding the protective scope of the invention.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of References (100-192)

| | |
|---|---|
| 100 | linear transport system |
| 101 | motion path of conveyor |
| 102 | assembly |
| 110 | linear motor |
| 111 | stator |
| 120 | guide rail |
| 121 | running surface |
| 122 | bottom side of the guide rail |
| 123 | top side of the guide rail |
| 127 | sealing ring |
| 128 | threaded holes |
| 129 | mounting surface |
| 140 | conveyor |
| 141 | magnet device |
| 142 | magnet arrangement |
| 143 | permanent magnets |
| 144 | rollers |
| 145 | base body of conveying device |
| 150 | fluid system |
| 151 | fluid channel through stator tooth |
| 152 | tubes |
| 153 | fluid connection to upper side of motor module |
| 154 | channel in upper fluid connection |
| 155 | lower fluid connection of fluid channel |
| 156 | channel in lower fluid connection |
| 157 | channel in lower part of motor module |
| 158 | fluid connection at bottom side of motor module |
| 160 | channel system in guide rail |
| 161 | central fluid channel |
| 162 | distribution channels |
| 163 | outlet for lubricant |
| 170 | actuator device |
| 171 | fluidic actuator |
| 172 | cylinder |
| 173 | piston |
| 174 | upper front face of the piston |
| 180 | spraying device |
| 181 | nozzle |
| 182 | nozzle opening |
| 190 | lubrication system |
| 191 | supply device of lubrication system |
| 192 | supply lines of lubrication system |

TABLE 2

List of References (200-330)

| | |
|---|---|
| 200 | motor module |
| 201 | motor module part facing the guide rail |
| 202 | motor module part facing away from the guide rail |
| 203 | top side of motor module |
| 204 | bottom side of motor module |
| 205 | first front face of motor module |
| 206 | second front face of motor module |
| 207 | interfaces of motor module |
| 208 | mounting surface of motor module |
| 210 | stator |

TABLE 2-continued

List of References (200-330)

| | |
|---|---|
| 211 | stator tooth |
| 212 | top side of stator tooth |
| 213 | bottom side of stator tooth |
| 214 | first front face of stator tooth |
| 215 | second front face of stator tooth |
| 216 | first side wall of stator tooth |
| 217 | second side wall of stator tooth |
| 218 | bore through stator tooth |
| 219 | groove in stator tooth |
| 220 | electric coil |
| 250 | supply devices |
| 300 | machine bed |
| 310 | supply devices |
| 320 | external computing device |
| 330 | control/signal lines |

What is claimed is:

1. A linear transport system comprising a linear motor having at least a motor module and at least a conveyor driven by the linear motor along a path of motion,
wherein said motor module comprises a stator magnetically interacting with a magnetic device of said conveyor, said stator having a plurality of stator teeth arranged side by side along said path of motion and a plurality of electric coils each wound around a stator tooth, and
wherein the linear transport system further comprises a fluid system comprising at least a fluid channel running through a stator tooth of the stator.

2. The linear transport system according to claim 1, wherein the fluid channel is configured in a stator tooth around which no electric coil is wound.

3. The linear transport system according to claim 1, wherein the fluid channel is formed by a tube arranged in a bore passing through the respective stator tooth or in a groove formed in a side wall of the respective stator tooth.

4. The linear transport system according to claim 1, wherein the fluid channel has a flattened cross-sectional profile, the diameter of which is larger in a magnetizing direction z of the stator tooth than its diameter in a direction x perpendicular thereto.

5. The linear transport system according to claim 1,
wherein the linear transport system comprises a guide rail, and
wherein the fluid channel is configured as a supply channel of a lubrication system for supplying a lubricant to at least one running surface of the guide rail.

6. The linear transport system according to claim 1,
wherein the fluid system comprises a spraying device having a nozzle for spraying a liquid or gaseous spray medium, and
wherein the fluid channel is configured as a feed channel for feeding the gaseous spray medium to the nozzle.

7. The linear transport system according to claim 1,
further comprising a hydraulic or pneumatic actuator device having a hydraulic or pneumatic actuator, and
wherein the fluid channel is configured as a supply channel for supplying a liquid or gaseous pressure medium to the actuator.

8. A motor module for a linear transport system for driving at least a conveyor along a path of motion,
wherein the motor module comprises a stator which, during operation of the linear transport system, magnetically interacts with a magnet device of the conveyor,
wherein a fluid channel is formed by a tube arranged in a bore passing through the stator, and
wherein the motor module is configured for mounting onto a guide rail, and wherein the fluid channel is configured as a supply channel of a lubrication system associated with the linear transport system for supplying a lubricant to at least one running surface of the guide rail.

9. The motor module according to claim 8, wherein the stator has a plurality of stator teeth arranged next to one another along the path of motion and a plurality of electric coils each wound around a stator tooth, wherein at least one of the stator teeth has the fluid channel for transporting a fluid through the motor module.

10. The motor module according to claim 9, wherein the fluid channel is formed in a stator tooth around which no electric coil is wound.

11. The motor module according to claim 9, wherein the fluid channel is formed by the tube arranged in a bore passing through the stator tooth or in a groove formed on a side wall of the respective stator tooth.

12. The motor module according to claim 8, wherein the fluid channel has a flattened cross-sectional profile, the diameter of which is larger in a magnetizing direction z of the stator tooth than its diameter in a direction x perpendicular thereto.

13. The motor module according to claim 8, wherein the fluid channel is used as a supply channel for supplying a liquid or gaseous spray medium to a spray device.

14. The motor module according to claim 8, wherein the fluid channel is formed as a supply channel of an actuator device for supplying a liquid or gaseous pressure medium to a hydraulic or pneumatic actuator.

15. A guide rail for a linear transport system with at least a motor module for driving at least a conveyor along a path of motion predetermined by the guide rail, comprising:
a mounting surface for mounting onto a correspondingly formed mounting surface of the motor module, and
at least a fluid channel fluidically communicating with a fluid connection formed in the mounting surface of the motor module.

16. The guide rail according to claim 15, wherein the fluid channel is formed as a supply channel of a lubrication system for supplying a lubricant to at least a running surface of the guide rail.

17. The guide rail according to claim 15,
wherein the guide rail has a nozzle for spraying a liquid or gaseous spray medium, and
wherein the fluid channel is configured as a supply channel for supplying the liquid or gaseous spray medium to the nozzle.

18. The guide rail according to claim 15,
wherein the guide rail comprises a hydraulic or pneumatic actuator, and
wherein the fluid channel is configured as a supply channel for supplying a liquid or gaseous pressure medium to the hydraulic or pneumatic actuator.

* * * * *